United States Patent
Green

(10) Patent No.: US 7,352,733 B2
(45) Date of Patent: Apr. 1, 2008

(54) IMPLEMENTING LOCATION AWARENESS IN WLAN DEVICES

(75) Inventor: Michael R. Green, Needham, MA (US)

(73) Assignee: Atheros Communications, Inc., Santa Clara, CA (US)

( * ) Notice: Subject to any disclaimer, the term of this patent is extended or adjusted under 35 U.S.C. 154(b) by 288 days.

(21) Appl. No.: 10/875,976

(22) Filed: Jun. 23, 2004

(65) Prior Publication Data

US 2005/0195777 A1    Sep. 8, 2005

Related U.S. Application Data

(60) Provisional application No. 60/550,000, filed on Mar. 3, 2004.

(51) Int. Cl.
*H04J 11/00* (2006.01)
(52) U.S. Cl. ............ 370/338; 455/434; 455/456; 709/222
(58) Field of Classification Search ............ 455/435.3, 455/2.01, 179.1, 556.5, 434, 435, 456; 375/316; 370/328, 338, 348; 709/222
See application file for complete search history.

(56) References Cited

U.S. PATENT DOCUMENTS

| | | | |
|---|---|---|---|
| 6,424,816 B1 * | 7/2002 | Stephens | 455/2.01 |
| 6,484,029 B2 * | 11/2002 | Hughes et al. | 455/434 |
| 6,526,264 B2 | 2/2003 | Sugar et al. | |
| 2002/0173272 A1 | 11/2002 | Liang et al. | |
| 2002/0191572 A1 | 12/2002 | Weinstein et al. | |
| 2003/0158922 A1 * | 8/2003 | Park | 709/222 |
| 2004/0022326 A1 * | 2/2004 | Morrish et al. | 375/316 |
| 2004/0198279 A1 * | 10/2004 | Anttila et al. | 455/179.1 |
| 2005/0037754 A1 * | 2/2005 | Liu et al. | 455/435.3 |
| 2006/0098593 A1 * | 5/2006 | Edvardsen et al. | 370/328 |
| 2006/0105785 A1 * | 5/2006 | Gfeller et al. | 455/456.5 |

* cited by examiner

*Primary Examiner*—Joseph Feild
*Assistant Examiner*—Michael T. Vu
(74) *Attorney, Agent, or Firm*—Bever, Hoffman & Harms, LLP; Jeanette S. Harms

(57) ABSTRACT

An ambient country identifier (ACI) signal can be used to automatically provide location awareness for a WLAN device. If an ACI signal is detected, then the WLAN device can configure itself to comply with channel and power settings for the country having the detected ACI signal. After detection of the ACI signal, the WLAN device can be "locked" to the country having that ACI signal, thereby ensuring legal operation of the WLAN device even after subsequent restarts. If an ACI signal is not detected, then the WLAN device can be configured in a default mode, e.g. an "open mode" in which end users can configure the WLAN device by entering a country of operation or a "common mode" in which the channel and transmit power settings meet global spectrum usage requirements.

8 Claims, 2 Drawing Sheets

IMPLEMENTING LOCATION AWARENESS IN WLAN DEVICES

RELATED APPLICATIONS

This application claims priority of U.S. Provisional Patent Application 60/550,000, entitled "System And Method For Communication" filed Mar. 3, 2004.

BACKGROUND OF THE INVENTION

1. Field of the Invention

The present invention relates to wireless local area network (WLAN) devices and in particular to implementing location awareness in such WLAN devices.

2. Description of the Related Art

Wireless local area networks (WLANs) are becoming increasingly popular as communication networks in many countries. Different countries can have different channel restrictions and/or power requirements for WLAN operation. To receive a certification from a country's spectrum regulator, e.g. the FCC in the U.S., a manufacturer must ensure that its WLAN devices can be configured to operate in the correct channel and power setting for that country. Allowing certification of frequency-selectable WLAN devices, thereby allowing a WLAN device to be configured for operation in multiple countries, would reduce production, testing, distribution, and stocking costs. This lower manufacturer cost should increase competition, and, ultimately, lower prices of the WLAN devices, thereby benefiting consumers.

Unfortunately, configuring a frequency-selectable WLAN device may be too tedious, time consuming, and/or challenging for end users to perform, thereby potentially resulting in the WLAN device operating on an illegal channel or at an illegal power level. To solve this problem, some access points provide a configuration software/menu that allows the end user to simply choose the country of operation. However, end users wishing to enable operation across a larger number of channels than legally allowed may opt to use an alternate country setting in the access point that will enable operation in additional channels at higher, but illegal, transmit power levels. Additionally, illegally imported access points may operate on channels that are illegal in the country of operation.

To further complicate WLAN operation enforcement, current IEEE standards, e.g. 802.11d and 802.11h, allow a WLAN client to be automatically configured by a country setting transmitted by its associated WLAN access point. Thus, if an access point is not configured to transmit the correct country information (whether intentionally or unintentionally), then not only the access point but also its associated clients may operate on channels illegal in the country of operation.

One solution for meeting the requirements of a spectrum regulator is to permanently configure an access point to conform to that country's channel and power settings. However, from a vendor's perspective, more "stock kit units" (SKUs), i.e. different versions of a product, are typically undesirable.

Another solution for meeting the requirements of a spectrum regulator is to implement additional radio hardware/software, e.g. a GPS receiver, to incorporate geo-location capability in the access point. Because GPS signals are transmitted at much lower frequencies than WLAN devices currently use, the access point would require a separate receive antenna for the GPS signals, thereby increasing the cost of the access point. Moreover, GPS signals may not be received reliably indoors, which is where an access point is typically located. Therefore, a GPS solution is undesirably both expensive and complex.

Therefore, a need arises for implementing location awareness in WLAN devices using a commercially viable technique.

SUMMARY OF THE INVENTION

Figure 1:
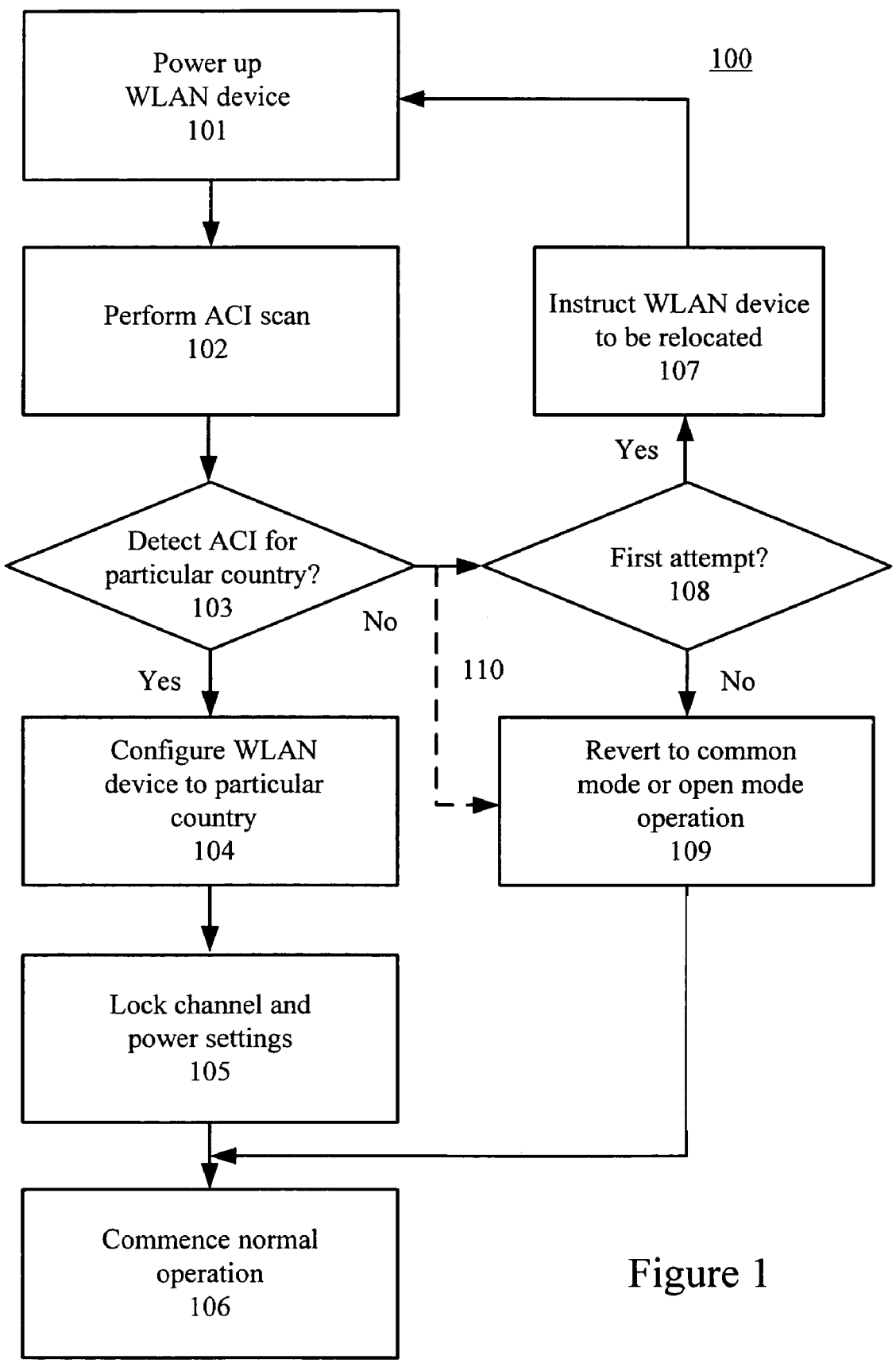
FIG. 1 illustrates a location awareness technique for using an ambient country identifier (ACI) signal to automatically provide a country of operation indicator for a WLAN device.

In accordance with one aspect of the invention, an ambient country identifier (ACI) signal can be used to automatically provide location awareness for a WLAN device. Advantageously, this ACI signal can be at a frequency within operating range of a receiver of the WLAN device. In one embodiment, the ACI signal frequency can be approximately 10-20% higher than the highest operating frequency detected by the WLAN device and approximately 10-20% lower than the lowest operating frequency detected by the WLAN device. Notably, in this range, a WLAN device can detect an ACI signal without significant changes to current WLAN technology.

If an ACI signal is detected, then the WLAN device can configure itself to comply with channel and power settings for the country having the detected ACI signal. For example, if the ACI signal is a Digital Audio Radio Service (DARS) signal, then the WLAN device can be configured for U.S. operation.

Under normal conditions, a WLAN device can easily detect an ACI signal (e.g. receive the DARS signal) because of its high transmit power. However, the WLAN device could be powered on in a location where ACI signals are blocked. Therefore, in one embodiment, if the scan is a first attempt to detect the ACI signal, then the end user operating the WLAN device can be instructed to relocate and then power up the WLAN device again. If the scan is not a first attempt, thereby indicating that relocating the WLAN device failed to resolve the ACI signal reception problem, then the WLAN device can be configured for a default mode (e.g. a common mode or an open mode). A detailed description of the default mode is provided later in this document.

In one embodiment, after detection of the ACI signal, the WLAN device can be "locked" to the country having that ACI signal. This locking can include programming non-volatile memory of the WLAN device to retain the current channel and power settings. This locking can also include initiating a protocol required by the country having the ACI signal. Such a protocol could include enabling radar detection. This locking can also include overriding any end user commands that could be inconsistent with regulations of the country having the ACI signal. Overriding end user commands could include disabling ad-hoc operation of the WLAN device in a predetermined frequency band.

Once in a default mode, an ACI signal recheck can be performed at regular-intervals (e.g. on the order of every 12 hours). In one embodiment, to minimize impact to standard operation of the WLAN device, a scan can be performed for the ACI signal during a low-utilization period. If the ACI signal is detected, then the WLAN device can be configured for compliance with the country having that ACI signal. If the ACI signal is not detected, then the WLAN device can continue operation in its current mode.

This ACI signal recheck can advantageously prevent an end user from intentionally initializing the WLAN device in a location known to have inadequate reception of the ACI signals or perhaps removing the transmit antenna of the WLAN device, thereby defeating the automatic configuration of the WLAN device. This ACI signal recheck can also improve performance of a WLAN device that is initially configured for the common mode. That is, once the ACI signal is detected, the channel and power settings of the actual country of operation can be used, which generally provide for additional channels and higher power settings.

A software program for automatically providing location awareness for a WLAN device is also described. The software program can include instructions for performing a scan or the ACI. If the ACI signal is detected, then the software program can also include instructions for configuring the WLAN device for the country having that ACI signal. If the ACI signal is not detected, then the software program can also include instructions for configuring the WLAN device for a default mode.

A WLAN device is also described. In one embodiment, this WLAN device can include the means for automatically providing location awareness for the WLAN device. The means for automatically providing location awareness can include instructions for performing a scan for the ACI signal and, if the ACI signal is detected, instructions for configuring the WLAN device for a country having the ACI signal. In another embodiment, the WLAN device can include the means for operating in a default mode. The means for operating in a default mode can include instructions for determining whether the WLAN device is in a low-utilization period, instructions for performing a scan for an ambient country identifier (ACI) signal if the WLAN device is in a low-utilization period, and instructions for configuring the WLAN device for compliance with a country having the ACI signal if the ACI signal is detected.

DETAILED DESCRIPTION OF THE DRAWINGS

In accordance with one aspect of the invention, one or more radio signals uniquely present in a country at a frequency within range of current WLAN receivers can be used to identify the country of operation. Advantageously, a WLAN device can detect these unique radio signals, called ambient country identifier (ACI) signals herein, without significant changes to current WLAN technology. Once an ACI is detected, the WLAN device can automatically "lock" its channel and power settings to those allowed in the country of operation. Using an ACI provides a low-cost, reliable scheme to ensure that the WLAN device (i.e. an access point and/or its associated clients) can operate on channels and at power levels legal in the country of operation.

In the U.S., exemplary ACI signals can include a Digital Audio Radio Service (DARS) signal. DARS signals in the relevant frequency bands are not present in Europe or Asia and no other country operates this service in the relevant frequency bands. Specifically, current WLAN receivers using existing 2.4 GHz or dual band 2.4+5 GHz antennas can receive a DARS signal, which can be found at 2.320-2.345 GHz.

Advantageously, DARS coverage is widespread across the U.S. in both urban and rural areas. Specifically, one of the two U.S. DARS licensees operates two geostationary orbit satellites located over the East and West coasts of the U.S. The second DARS licensee operates three satellites in elliptical orbits over North America.

Additionally, the DARS satellites include powerful transmitters that may beam 10 megawatts of equivalent transmitted power back to earth. Therefore, the WLAN device can easily detect DARS signals in either of the two sets of channels (i.e. in 2.320-2.3325 GHz or 2.3325-2.345 GHz) without the need for additional receivers or antennas.

To access (i.e. decode the programming of) a DARS signal, a WLAN device would need a "subscription" to the DARS service. However, in accordance with one aspect of the invention, the WLAN device can simply detect the presence of a DARS signal in the expected frequency band without need of a subscription.

This detection can be performed even if the DARS signal is encoded. Moreover, current WLAN receivers can also be readily adapted to adequately receive other DARS signal types, e.g. DARS signals encoded with QPSK modulation using two channels occupying approximately 8.3 MHz of bandwidth or encoded with OFDM modulation from terrestrial repeaters using approximately 4.2 MHz of bandwidth. Because current WLAN receivers can demodulate QPSK and OFDM signals, WLAN chipsets and receiver algorithms can be readily extended to receive encoded DARS signals.

Specifically, IEEE 802.11g OFDM encoding of signals and DARS terrestrial signal C-OFDM encoding is substantially the same. C-OFDM encoding is a modulation scheme tailored to the digital broadcast of audio or video signals using forward error-correction coding. Similarly, IEEE 802.11g and 802.11b QPSK encoding of signals and DARS satellite signal QPSK encoding is substantially the same.

Because WLAN devices can already receive and detect OFDM and QPSK encoded signals, additional decoding algorithms and/or gates in WLAN device for receiving and detecting DARS encoded signals is unnecessary, thereby minimizing additional engineering and product cost. Moreover, because the DARS signal, irrespective of encoding, is transmitted in a known frequency band, the need to anticipate the particular encoding of the DARS signal is eliminated. In other words, the WLAN device can simply detect the presence of the DARS encoded signal within the expected frequency band. Advantageously, FCC conformance testing and/or regulatory approval of the WLAN device is not required for this detect-only function.

FIG. 1 illustrates a location awareness technique 100 for using an ACI signal to automatically determine the country of operation for a WLAN device. In technique 100, step 101 powers up the WLAN device. In step 102, the WLAN device can perform an ACI scan for a predetermined period of time (e.g. 20 seconds). In one embodiment where the WLAN device is marketed in (and thus is operable in) multiple countries, the WLAN device can listen for multiple ACI signals in succession.

Note that ACI signals are typically transmitted in different frequency bands for different countries. Thus, if the WLAN device is powered on in Europe, then the WLAN device will not detect a DARS signal (i.e. the U.S. ACI signal) because the DARS signal is not present in 2.320-2.345 GHz channel in Europe. If an ACI for a particular country is detected in step 103, then the WLAN device can be configured for that particular country in step 104.

In step 105, the WLAN device can "lock" itself to the channel and power settings required by the country of operation. In one embodiment, the WLAN device can communicate this country of operation to the end user (e.g. by using an LED, a console, or a Web interface). In one embodiment, the WLAN device can store a "flag" in non-volatile memory indicating that the WLAN device was automatically configured for a specific country of operation. At this point, the end user can power-off the WLAN device and relocate it as desired. Upon subsequent power-up, the WLAN device can detect the flag and confirm that operation in that country can commence.

This locking mechanism can also initiate certain protocols required by the country of operation and/or override any end user commands that could, unintentionally or intentionally, be inconsistent with the regulations of the country of operation. For example, locking the WLAN device to the U.S. could enable radar detection in 5.25-5.35 and 5.47-5.725 GHz as required by the FCC. In another embodiment, locking the WLAN device to the U.S. could disable 5 GHz ad-hoc operation in those same bands (also required by the FCC). Once the channel and power setting are locked, the WLAN device can commence normal operation in step 106.

If the WLAN device does not detect an ACI signal for a particular country in step 103, then step 108 can determine if this was a first attempt to detect an ACI signal. Note that under normal conditions, a WLAN device can easily detect an ACI signal (e.g. receive the DARS signal) because of its high transmit power. However, the WLAN device could be powered on in a location where ACI signals (e.g. the DARS signals) are blocked. Such locations could include underground areas or extremely mountainous geographic areas.

Therefore, if it was a first attempt to detect an ACI signal, then the WLAN device could inform the end user that automatic configuration cannot occur and instruct the end user to temporarily relocate the WLAN device (e.g. to a location at higher elevation or to an area with clear access to the sky) in step 107. In one embodiment, the WLAN device could use an LED display to perform this function. In other embodiments, the WLAN device could send a message to the end user using an access point console or a Web interface. Once relocated to a location more suitable for ACI signal reception, the WLAN device could be powered-up again in step 101.

If it was not a first attempt to detect an ACI scan (step 108), thereby indicating that relocating the WLAN device failed to resolve the ACI signal reception problem, then the WLAN device can revert to a default mode in step 109. In one embodiment, the WLAN device could use a specific default mode based on the region in which it is to be marketed.

For example, a default mode for WLAN devices marketed in Europe could be an. "open mode" in which end users can configure the WLAN device by entering a country of operation. In this case, the WLAN device could allow an end user to view a country configuration menu, thereby allowing the end user to choose a country of operation. Note that the open mode is not allowed in some countries, e.g. the U.S. or Japan. Therefore, a default mode for WLAN devices marketed in the U.S. or Japan could be a "common mode".

Common mode operation can be defined as a default channel and transmit power configuration known to meet global spectrum usage requirements (i.e. is designed to meet regulatory requirements, regardless of location). The disadvantage of a device operating in common mode is that it cannot operate in additional channels or at higher power levels than may be allowed in its actual (but unknown) country of operation. Table 1 indicates exemplary common mode operation for WLAN devices.

TABLE 1

Common Mode Operation
Common Mode Operation for WLAN Access Point

| 2.4 GHz Channels | 5.15-5.35 GHz | 5.47-5.725 GHz | 5.725-5.850 GHz |
|---|---|---|---|
| IEEE Channels 1-11 | Disabled | Disabled | Disabled |

Tables 2-4 indicate channels and associated IEEE channels of operation for the U.S., Europe, and Japan, respectively.

TABLE 2

U.S. Operation
U.S. Operation for WLAN Access Point

| 2.4 GHz Channels | 5.15-5.35 GHz | 5.47-5.725 GHz | 5.725-5.850 GHz |
|---|---|---|---|
| IEEE Channels 1-11 | IEEE Channels 36-48 | IEEE Channels 100-140 | IEEE Channels 149-165 |

TABLE 3

European Community Operation
European Community Operation for WLAN Access Point

| 2.4 GHz Channels | 5.15-5.35 GHz | 5.47-5.725 GHz | 5.725-5.850 GHz |
|---|---|---|---|
| IEEE Channels 1-13 | IEEE Channels 36-48 | IEEE Channels 100-140 | Disabled |

TABLE 4

Japan Operation
Japan Operation for WLAN Access Point

| 2.4 GHz Channels | 5.15-5.35 GHz | 5.47-5.725 GHz | 5.725-5.850 GHz |
|---|---|---|---|
| IEEE Channels 1-14 | IEEE Channels 36-48 | Disabled | Disabled |

If the WLAN device configures itself for common mode operation, by definition the WLAN device would commence operation only using channels and power levels known to be legal in all countries. Although perhaps more limited in the channels or higher power levels than may be allowed in the country of operation, the common mode may ensure that the WLAN device (i.e. the access point and/or one of its associated clients) is operating legally.

Figure 2:
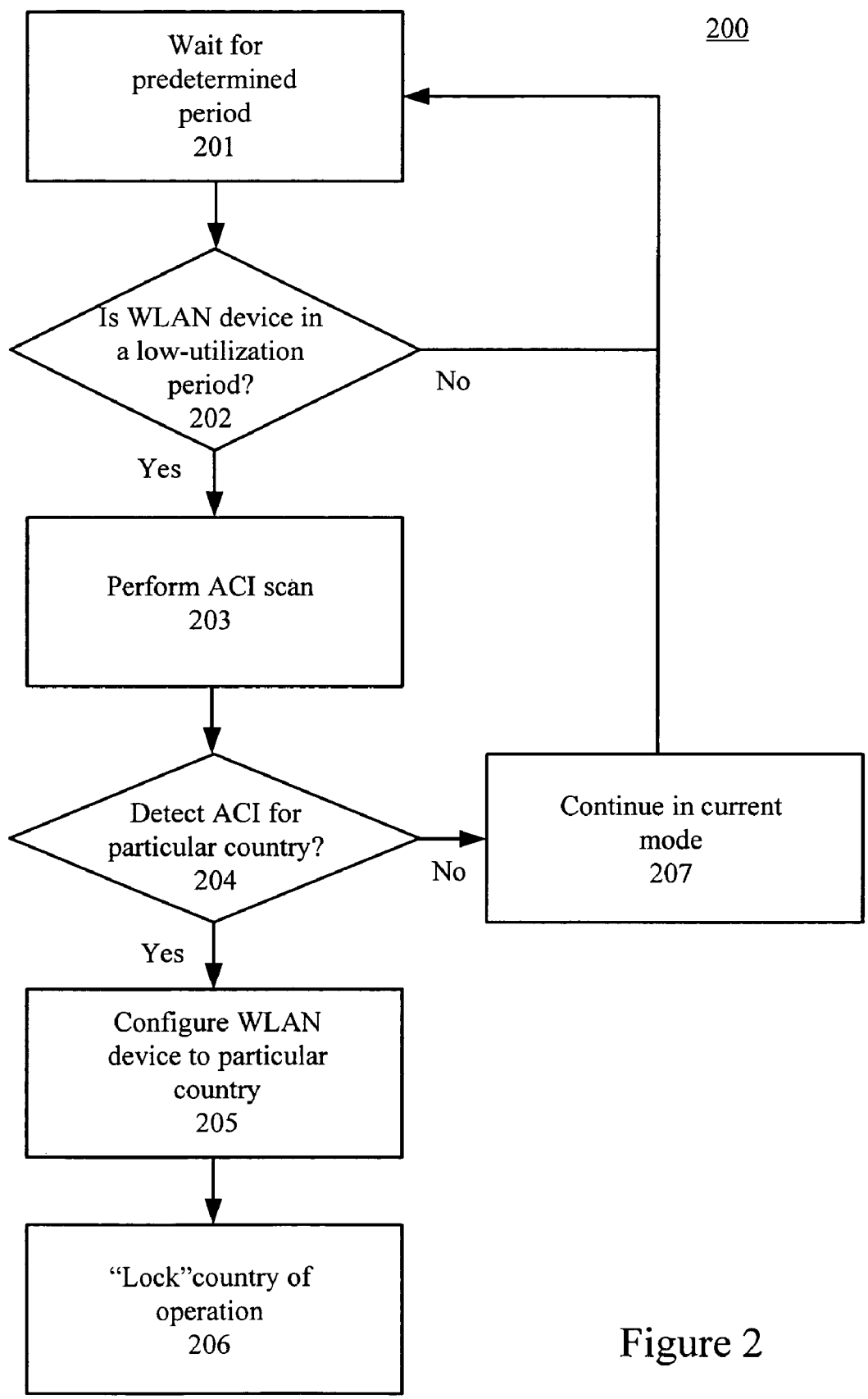
FIG. 2 illustrates an ACI signal recheck technique that can be periodically performed if the WLAN device is in a common mode, an open mode, or another default mode

After reverting to the default mode in step 109, the WLAN device can commence normal operation in step 106. To reduce the risk of negative consequences in the open mode (i.e. interference caused by the access point to other users or negative action by the FCC) or to improve performance in the common mode, the WLAN device can be configured to periodically check for the ACI signal. FIG. 2 illustrates an ACI recheck technique 200 that can be performed if the WLAN device is in a common mode, an open mode, or another default mode.

In step 201, the WLAN device can perform the ACI recheck at regular intervals. In one embodiment, the predetermined wait period can be 12 hours. Step 202 determines whether a WLAN device is in a low-utilization period, thereby minimizing impact to standard operation of the WLAN device. If not, then the WLAN device can return to step 201. In one embodiment, the predetermined wait period following step 202 can be significantly shorter than the initial period, e.g. on the order of 0.5 hours. If the WLAN device is in a low-utilization period, then the WLAN device can temporarily pause its operation and initiate a "listen" period for the ACI signal in step 203. If the access point detects the ACI for a particular country 204, then the channel and power settings can be configured to that country of operation in step 205.

In step 206, the WLAN device can "lock" itself to the channel and power requirements conforming to the designated country of operation. As described previously, this locking mechanism can initiate certain protocols required by the country of operation and/or override any end user commands that could, unintentionally or intentionally, be inconsistent with the regulations of the country of operation.

If the WLAN device does not detect an ACI in step 204, then the WLAN device can continue using its current channel and power settings in step 207 and then return to step 201 to wait for a predetermined period of time. In one embodiment, this period of time can be set to the initial interval period (e.g. 12 hours).

ACI recheck technique 200 can advantageously prevent an end user from intentionally initializing the WLAN device in a location known to have inadequate reception of the ACI signals or perhaps removing the transmit antenna of the WLAN device, thereby defeating the automatic configuration of the WLAN device. ACI recheck technique 200 can also improve performance of a WLAN device that is initially configured for the common mode. That is, once the ACI signal is detected, the channel and power settings of the actual country of operation can be used, which generally provide for additional channels and higher power settings.

Note that if an end user is legitimately located in an area with extreme geographic features or located underground where both terrestrial repeaters and satellite signals cannot be received, then logically, the risk of the WLAN device causing interference to other licensed services due to incorrect channel settings is greatly reduced because reception and transmission gains of the WLAN device are reciprocal. For example, if reception of the ACI signal is completely blocked in the 2.3 GHz band, then possibly interfering signals caused by the WLAN device due to operation on "illegal" channels in the U.S. (such as 2.497 GHz=802.11b/g IEEE channel 14) are likely to be equally attenuated.

Reception of DARS signal in Canada

Note that because the DARS satellites may provide coverage over portions of Canada, it is possible that WLAN devices sold in Canada could be automatically configured for U.S. operation instead. Fortunately, this U.S. configuration is acceptable in Canada as the channel and power settings for Canada are more relaxed or the same as those for the U.S.

Moreover, Canada is in the process of updating its 5 GHz spectrum allocation for WLAN devices so that the recently opened 5.47 GHZ U-NII band in the U.S. will also be available in Canada. In this particular sub-band, the case of a U.S. configured WLAN device operating in Canada poses no risk to licensed users or government or civilian radar systems operating in this band. Specifically, a WLAN device configured for U.S. operation in the 5.47 GHz band will implement Dynamic Frequency Selection (DFS), which can protect against co-channel operation with radar systems irrespective of location in the U.S. or Canada.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, as described above, ACI signal detection can be applied equally to access points and clients. Note that applying ACI identification to clients can advantageously reduce the risk posed by association with an access point not having location awareness.

In one embodiment, a WLAN device that does not detect an ACI for a particular country can be immediately configured for a default mode (e.g. either the common mode or the open mode), as shown by a dashed arrow 110 from step 103 to step 109 in FIG. 1. In this case, the ACI recheck (e.g. steps 201-207 in FIG. 2) can still be performed after step 106

Note that although a specific ACI signal is discussed herein, other ACI signals can be present in different countries. In general, a candidate ACI signal type can include the following criteria. The ACI signal should be within (or nearby) WLAN operating frequencies, thereby allowing that ACI signal to be detected by WLAN receiver technology without significant additional engineering effort. Additionally, the ACI signal should be uniquely present in a country or region. Preferably, the ACI signal is widely present geographically within the country (or region) and is operational for a known time period.

In one embodiment, a technique for discontinuing the use of a particular ACI signal can be provided. For example, in one embodiment, a sunset period could be built into the software if, at time of manufacture, it is known that the particular ACI signal will be discontinued. This time period could be stored in non-volatile memory. Once the use of that ACI signal is discontinued, another ACI signal (which could also be stored in non-volatile memory, if known) could be used. In one embodiment, if the periodic recheck for a particular ACI signal is unsuccessful after a predetermined number of tries, then a search for an alternative. ACI signal can be performed.

In another embodiment, an automatic, secure update service (e.g. a service provided via the Internet) can provide the access point with an update to the ACI signal list/table or to the ACI algorithm. This update can be triggered by changes in the availability of certain ACI signals in one or more countries and/or changes to regulatory rules for allowed channels/powers.

Accordingly, it is intended that the scope of the invention be defined by the following Claims and their equivalents.

The invention claimed is:

1. A method of automatically providing location awareness for a WLAN device, the method comprising:
   performing a scan for an ambient country identifier (ACI) signal, wherein the ACI signal is at a frequency within operating range of a receiver of the WLAN device;
   if the ACI signal is detected, then configuring the WLAN device for compliance with a country having the ACI signal;

determining whether the scan is a first attempt to detect the ACI signal;

instructing the WLAN device to be relocated and then powered up if the scan is a first attempt and does not detect the ACI signal; and automatically configuring the WLAN device for one of a common mode and an open mode if the scan is not a first attempt and does not detect the ACI signal, wherein configuring the WLAN device for the common mode includes using a channel and a transmit power that meet global spectrum usage requirements, and wherein configuring the WLAN device for the open mode includes allowing an end user to view a country configuration menu and to select a country from the country configuration menu.

2. The method of claim 1, wherein if the ACI signal is a Digital Audio Radio Service (DARS) signal, then configuring the WLAN device for U.S. operation.

3. The method of claim 1, wherein configuring includes locking the WLAN device to the country having the ACI signal.

4. The method of claim 3, wherein locking includes programming non-volatile memory of the WLAN device to retain current channel and power settings.

5. The method of claim 4, wherein locking includes initiating a protocol required by the country having the ACI signal.

6. The method of claim 5, wherein the protocol includes enabling radar detection.

7. The method of claim 4, wherein locking includes overriding any end user commands that could be inconsistent with regulations of the country having the ACI signal.

8. The method of claim 7, wherein overriding any end user commands includes disabling ad-hoc operation of the WLAN device in a predetermined frequency band.

* * * * *